United States Patent
Kim et al.

(10) Patent No.: US 11,138,446 B2
(45) Date of Patent: Oct. 5, 2021

(54) APPARATUS AND METHOD FOR DETECTING OBJECT OF A VEHICLE

(71) Applicants: Hyundai Motor Company, Seoul (KR); Kia Motors Corporation, Seoul (KR); Chung Ang University Industry Academic Cooperation Foundation, Seoul (KR)

(72) Inventors: Hyun Sang Kim, Gyeonggi-do (KR); Yun Sup Ann, Gyeonggi-do (KR); Joon Ki Paik, Seoul (KR); Jin Beum Jang, Gyeonggi-do (KR); Nak Eun Choi, Busan (KR); Yeon Seung Choo, Chungcheongnam-do (KR)

(73) Assignees: Hyundai Motor Company, Seoul (KR); Kia Motors Corporation, Seoul (KR); Chung Ang University Industry Academic Cooperation Foundation, Seoul (KR)

( * ) Notice: Subject to any disclaimer, the term of this patent is extended or adjusted under 35 U.S.C. 154(b) by 138 days.

(21) Appl. No.: 16/569,003

(22) Filed: Sep. 12, 2019

(65) Prior Publication Data
US 2020/0327337 A1    Oct. 15, 2020

(30) Foreign Application Priority Data
Apr. 15, 2019   (KR) .................. 10-2019-0043494

(51) Int. Cl.
*G06K 9/00* (2006.01)
*G06K 9/46* (2006.01)
*B60W 30/095* (2012.01)

(52) U.S. Cl.
CPC ..... *G06K 9/00791* (2013.01); *B60W 30/0956* (2013.01); *G06K 9/00127* (2013.01); *G06K 9/4604* (2013.01); *B60W 2420/42* (2013.01)

(58) Field of Classification Search
None
See application file for complete search history.

(56) References Cited

U.S. PATENT DOCUMENTS

| | | | |
|---|---|---|---|
| 2015/0077323 A1* | 3/2015 | Ramaswamy | G06F 3/0304 345/156 |
| 2018/0314916 A1* | 11/2018 | Bovyrin | G06K 9/6228 |
| 2018/0365888 A1* | 12/2018 | Satzoda | G06K 9/00791 |

OTHER PUBLICATIONS

S. Zhang, et al., "Filtered channel features for pedestrian detection," in Proc. of CVPR, 2015, pp. 1-12. (Year: 2015).*

(Continued)

*Primary Examiner* — Wei Wen Yang
(74) *Attorney, Agent, or Firm* — Mintz Levin Cohn Ferris Glovsky and Popeo, P.C.; Peter F. Corless

(57) ABSTRACT

An apparatus for detecting an object of a vehicle is provided. The apparatus includes a camera that acquires an image from front of a vehicle and a controller that generates feature pyramid images based on a plurality of feature images extracted from the image. The controller also generates feature aggregation images by filtering the feature pyramid images, detects a pedestrian area from the feature aggregation images, and detects face regions from the feature pyramid images. At least one of the face regions that overlaps the pedestrian area is then determined as a face of a pedestrian.

18 Claims, 16 Drawing Sheets

(56) References Cited

OTHER PUBLICATIONS

Bin Yang "Aggregate Channel Features for Multi-view Face Detection," Biometrics (IJCB), 2014 IEEE International Joint Conference on IEEE, 2014, pp. 1-8. (Year: 2014).*

Yang, B., Yan, J., Lei, Z., & Li, S. Z. (Sep. 2014). Aggregate channel features for multi-view face detection. In IEEE international joint conference on biometrics (pp. 1-8). IEEE.

Mam, W., Dollár, P., & Han, J. H. (2014). Local decorrelation for improved pedestrian detection. In Advances in Neural Information Processing Systems (pp. 1-9).

Zhang, S., Benenson, R., & Schiele, B. (2015). Filtered feature channels for pedestrian detection. In Proceedings of the IEEE Conference on Computer Vision and Pattern Recognition (pp. 1751-1760).

Dollár, P., Appel, R., Belongie, S., & Perona, P. (2014). Fast feature pyramids for object detection. IEEE transactions on pattern analysis and machine intelligence, 36(8), pp. 1-14.

Dollár, P., Tu, Z., Perona, P., & Belongie, S. (2009). Integral channel features.

Leeyeon Ahn, Jinbeum Jang, Youngran Jo, Sijung Kim, and Joonki Paik, "Fast Pedestrian Detection Using Local Binary Pattern Feature Channel", IEEE/IEIE Int. Conf. Consumer Electronics—Asia 2018.

* cited by examiner

301

401

1110

| 30 | 90 | 120 |
|----|----|-----|
| 40 | 80 | 120 |
| 60 | 70 | 130 |

1120

| 0 | 1 | 1 |
|---|---|---|
| 0 | ● | 1 |
| 0 | 0 | 1 |

FIG. 11

APPARATUS AND METHOD FOR DETECTING OBJECT OF A VEHICLE

CROSS-REFERENCE TO RELATED APPLICATION

This application claims the benefit of priority to Korean Patent Application No. 10-2019-0043494, filed on Apr. 15, 2019, the entire contents of which are incorporated herein by reference.

TECHNICAL FIELD

The present disclosure relates to an apparatus and a method for detecting an object of a vehicle, and more particularly, to an apparatus and method that more accurately perform face detection from a camera image.

BACKGROUND

Recently, technology of detecting a pedestrian based on an image acquired by capturing the front of a vehicle has been developed. General the technology of detecting a pedestrian may be utilized in a technical field for calculating a distance to a pedestrian and preventing collision. However, in general, since a camera mounted on a vehicle has difficult to recognize a face of a pedestrian due to low resolution thereof, and in particular, since a face occupies a small area among the entire area of a pedestrian, it may be difficult to extract a feature of a face portion. Therefore, the general pedestrian detection technique has a problem in that it is difficult to be utilized in a technical field requiring more accurate face detection.

SUMMARY

The present disclosure has been made to solve the above-mentioned problems occurring in the prior art while advantages achieved by the prior art are maintained intact. An aspect of the present disclosure provides an apparatus and a method for detecting an object in a vehicle, which may be utilized in a technical field requiring more accurate face detection by accurately detecting a face using an image acquired from a camera.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, an apparatus for detecting an object of a vehicle may include a camera configured to acquire an image from front of the vehicle, and a controller configured to generate feature pyramid images based on a plurality of feature images extracted from the image, generate feature aggregation images by filtering the feature pyramid images, detect a pedestrian area from the feature aggregation images, detect face regions from the feature pyramid images, and determine at least one of the face regions overlapping the pedestrian area as a face of a pedestrian.

The feature pyramid images may be generated by down-scaling the feature image from an original size at a predetermined ratio. The controller may be configured to generate a filter bank by performing a convolution operation or a correlation operation on a first feature filter and a second feature filter and generate the feature aggregation images by filtering the feature pyramid images using the filter bank. The controller may be configured to generate a training feature image based on feature information extracted from a training image and generate the first feature filter from the training feature image based on a Local Binary Pattern method.

The controller may be configured to generate a first feature aggregation image by filtering the training feature image using the first feature filter and generate a second feature filter from the first feature aggregation image based on a Locally De-correction Channel Feature (LDCF) method. The controller may be configured to generate a training feature aggregation image by filtering the training feature image using the filter bank and generate a pedestrian classifier for classifying the pedestrian area in the training feature aggregation image. The controller may be configured to detect the pedestrian area from the feature aggregation images using the pedestrian classifier.

Additionally, the controller may be configured to detect the pedestrian area from the feature aggregation images using the pedestrian classifier. The controller may be configured to synthesize a region having a highest score among the face regions overlapping the pedestrian area, with the pedestrian area. The controller may then be configured to determine the region having the highest score as the face of the pedestrian, calculate a probability that an object of the image in the face region overlapping the pedestrian area is a face of the pedestrian, and generate the score based on the probability.

According to another aspect of the present disclosure, a method for detecting an object of a vehicle may include acquiring an image from front of the vehicle, generating feature pyramid images based on a plurality of feature images extracted from the image, generating feature aggregation images by filtering the feature pyramid images, detecting a pedestrian area from the feature aggregation images, detecting face regions from the feature pyramid images, and determining at least one of the face regions overlapping the pedestrian area as a face of a pedestrian. The feature pyramid images may be generated by down-scaling the feature image from an original size at a predetermined ratio.

The method may further include generating a filter bank by performing a convolution operation or a correlation operation on a first feature filter and a second feature filter and generating the feature aggregation images by filtering the feature pyramid images using the filter bank. The first feature filter may be configured to generate a training feature image based on feature information extracted from a training image and generate the first feature filter from the training feature image based on a Local Binary Pattern method. The second feature filter may be configured to generate a first feature aggregation image by filtering the training feature image using the first feature filter and generate a second feature filter from the first feature aggregation image based on a Locally De-correction Channel Feature (LDCF) method.

The method may further include generating a training feature aggregation image by filtering the training feature image using the filter bank, and generating a pedestrian classifier for classifying the pedestrian area in the training feature aggregation image. In addition, the method may include detecting the pedestrian area from the feature aggregation images using the pedestrian classifier and synthesizing a region having a highest score among the face regions overlapping the pedestrian area with the pedestrian area. The method may further include determining the region having the highest score as the face of the pedestrian, calculating a probability that an object of the image in the face region overlapping the pedestrian area is a face of the pedestrian, and generating the score based on the probability.

BRIEF DESCRIPTION OF THE DRAWINGS

The above and other objects, features and advantages of the present disclosure will be more apparent from the following detailed description taken in conjunction with the accompanying drawings:

FIG. 11 schematically illustrates a method of extracting LBP information from each pixel of a training feature image according to an exemplary embodiment of the present disclosure;

DETAILED DESCRIPTION

Figure 1:
FIG. 1 illustrates a block diagram of an apparatus for detecting an object of a vehicle according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter, some exemplary embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the exemplary embodiment of the present disclosure, a detailed description of well-known features or functions will be ruled out in order not to unnecessarily obscure the gist of the present disclosure.

In describing the components of the exemplary embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a block diagram of an apparatus for detecting an object of a vehicle according to an exemplary embodiment of the present disclosure. As illustrated in FIG. 1, an apparatus 100 for detecting an object of a vehicle according to the present disclosure may include a camera 110, storage 120, and a controller 130.

The camera 110 may be configured to acquire an image from an area in front of the vehicle by photographing the front of the vehicle (e.g., the surroundings in the driving direction of the vehicle). More specifically, the camera 110 may be configured to acquire an object image and a non-object image in front of the vehicle. For example, the object image may include a pedestrian image, and the non-object image may include a non-pedestrian image. However, the object image is not limited to the pedestrian image, and may include an image of an object that may pose a risk to the driving or driver of the vehicle in the front of the vehicle. The camera 110 may include a Charge-Coupled Device (CCD) camera or a Complementary Metal-Oxide-Semiconductor (CMOS) color image sensor.

The storage 120 may be configured to store the filter bank generated by the controller 130. In addition, the storage 120 may be configured to store a pedestrian classifier for classifying a pedestrian area in a training feature image filtered using the filter bank, and a result of learning the pedestrian area based on the classified pedestrian area. The storage 120 may also be configured to store a face classifier for classifying a face region in the training feature image and a result of learning the face region based on the classified face region. The storage 120 may include at least one medium of a flash memory, a hard disk, a Read-Only Memory (ROM), a Random Access Memory (RAM), a memory card, an Electrically Erasable Programmable Read-Only Memory (EEPROM), a Programmable Read-Only Memory (PROM), a magnetic memory, a magnetic disk, and an optical disk.

The controller 130 may be configured to execute overall operation of the apparatus for detecting an object in the vehicle. In particular, the controller 130 may be configured to generate a filter bank through a convolution operation or a correlation operation on two filters, generate feature aggregation images by filtering feature pyramid images using the filter bank, detect a pedestrian area based on the feature aggregation image, detect face regions based on the feature pyramid images, and determine at least one of the face regions overlapping the pedestrian area as a face of a pedestrian, thereby more accurately detecting the face of the pedestrian.

Therefore, the apparatus for detecting an object of a vehicle according to the present disclosure may be utilized in a technical field for preventing privacy invasion by blurring only the detected face region, and may be utilized in a technical field for accurately responding to or preventing crime occurring in the vicinity of a vehicle by more accurately determining the face of the pedestrian since it may be possible to determine and detect the face of the pedestrian more accurately. To describe the operation of the controller 130 in more detail, a configuration of the controller 130 will be divided to detailed configurations and the operation of the controller 130 will be described for each of the configurations with reference to FIG. 2 to FIG. 9.

Figure 2:
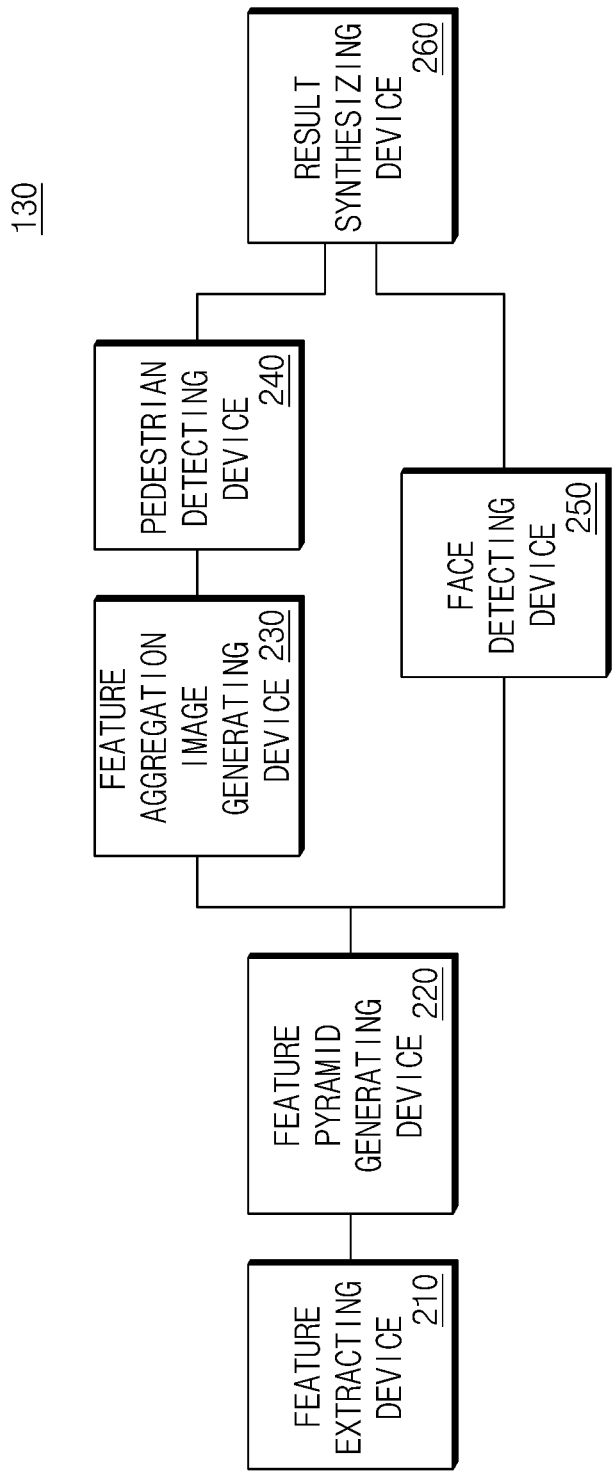
FIG. 2 illustrates a detailed block diagram of a controller according to an exemplary embodiment of the present disclosure.

FIG. 2 is a detailed block diagram of the controller 130 according to an exemplary embodiment of the present disclosure. As illustrated in FIG. 2, the controller 130 may include a feature extracting device 210, a feature pyramid generating device 220, a feature aggregation image generating device 230, a pedestrian detecting device 240, a face detecting device 250 and a result synthesizing device 260.

Figure 3:
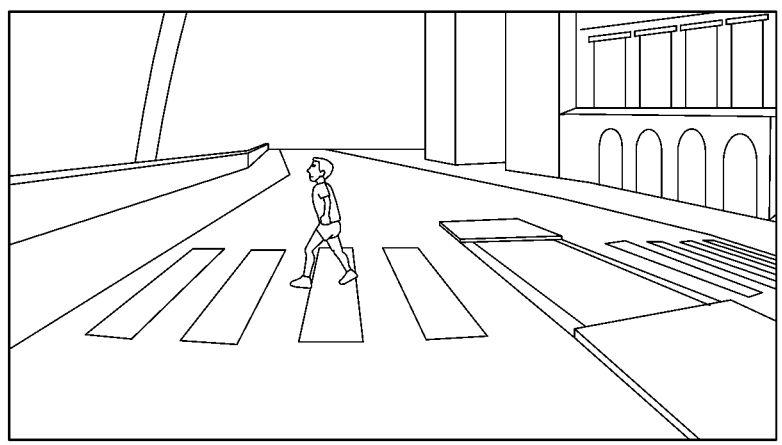
FIG. 3 illustrates an image acquired according to an exemplary embodiment of the present disclosure.

The operation of the feature extracting device 210 will be described with reference to FIG. 3 to FIG. 4. FIG. 3 illustrates an image acquired from a camera according to an exemplary embodiment of the present disclosure, and FIG. 4 illustrates a feature image according to an exemplary embodiment of the present disclosure.

Figure 4:
FIG. 4 illustrates a feature image according to an exemplary embodiment of the present disclosure.

The feature extracting device 210 may be configured to extract feature information from an image 301 of FIG. 3 acquired from the camera and generate a feature image 401 of FIG. 4. The feature extracting device 210 may be configured to generate the feature image 410 by extracting the feature information including three LUV image channels, one magnitude channel, and six Histogram of Oriented Gradient (HoG) channels, forming a plurality of images including different feature information from the image 310, merging the plurality of images, and down-scaling the merged image. Accordingly, the feature image 410 may refer to an image including one piece of feature information of feature information including 10 channels.

Figure 5:
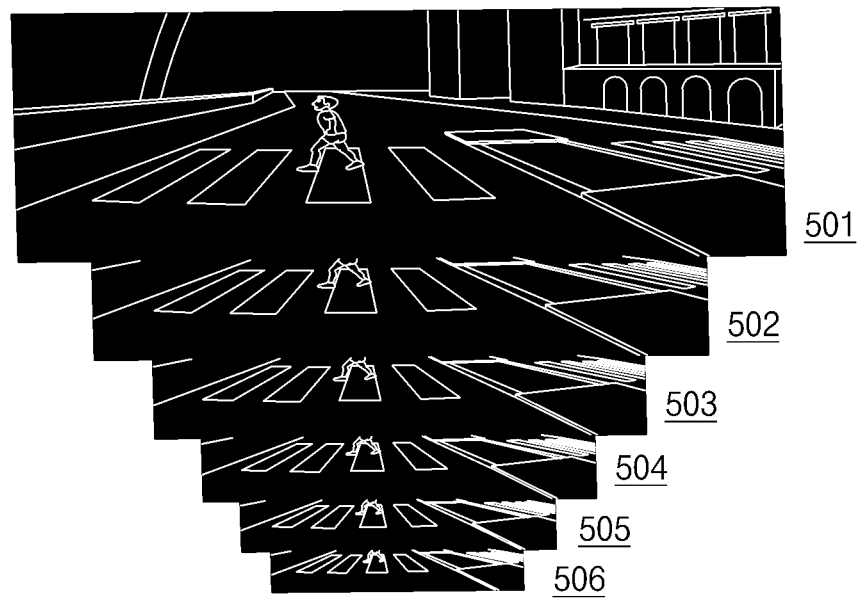
FIG. 5 illustrates a feature pyramid generated according to an exemplary embodiment of the present disclosure.

The feature pyramid generating device 220 may be configured to generate a feature pyramid based on the Aggregate Channel Features (ACF) method. The operation of the feature pyramid generating device 220 will be described with reference to FIGS. 4 and 5. FIG. 5 is a feature pyramid generated according to an exemplary embodiment of the present disclosure.

As illustrated in FIG. 5, the feature pyramid generating device 220 may be configured to repeatedly down-scale the feature image 410, extracted by the feature extracting device 210, from the original size thereof at a predetermined ratio to generate feature images 501 to 506 of different sizes. In the disclosure, the number of feature images constituting the feature pyramid is not limited to the number illustrated in FIG. 5, and may be variable. The feature image may be repeatedly down-scaled from the original size at a predetermined ratio to detect a pedestrian that may exist in a range from a short distance to a long distance with the vehicle as a start point. In other words, the feature image 510 of the original size in the feature pyramid may be used to detect a pedestrian existing at a short distance (e.g., less than a predetermined distance) from the vehicle, and the feature image 560 of a reduced size, which is resulted from repetitive down-scaling, may be used to detect a pedestrian existing at a long distance (e.g., greater than the predetermined distance) from the vehicle.

The feature aggregation image generating device 230 may be configured to generate feature aggregation images by filtering the feature pyramid images using a pre-generated filter bank. Specifically, the feature aggregation image generating device 230 may be configured to generate the feature aggregation images by performing a convolution operation or a correlation operation on the pre-generated filter bank and the feature pyramid. In the disclosure, the pre-generated filter bank may be generated by a convolution operation or a correlation operation on two filters, and may be used as a device for processing a feature pyramid image such that the feature pyramid image has a subdivided feature to detect a pedestrian area more accurately.

Accordingly, the feature aggregation image generating device 230 may be configured to generate a plurality of feature images, that is, feature aggregation images, in which features of the feature pyramid images are subdivided using the pre-generated filter bank. More specifically, the feature aggregation image generating device 230 may be configured to generate the feature aggregation images by performing a convolution operation or a correlation operation on the feature pyramid images and the filter bank. A more detailed description of the filter bank will be given below with reference to FIGS. 9 and 10.

The pedestrian detecting device 240 may be configured to detect the pedestrian area from the feature aggregation images. Specifically, the pedestrian detecting device 240 may be configured to detect the pedestrian area from the feature aggregation images based on a pre-generated pedestrian classifier. The pedestrian detecting device 240 may be configured to generate a filter bank based on a training feature image, generate a training feature aggregation image by filtering the training feature image using the filter bank, and generate a pedestrian classifier for classifying the pedestrian area in the training feature aggregation image based on the decision tree (Adaboost tree) method. The pedestrian detecting device 240 may be configured to store a result of detection of the pedestrian area in the storage 120. A more detailed description of the pedestrian detecting device 240 will be given with reference to FIGS. 6 and 8.

The face detecting device 250 may be configured to detect face regions from the feature pyramid images. Specifically, the face detecting device 250 may be configured to detect the face regions from the feature pyramid images based on a pre-generated classifier. Although it is described in the present disclosure that the face detecting device 250 detects the face regions using the face classifier generated using the decision tree method, it is not limited thereto. For example, the face regions may be detected by the Support Vector Machine (SVM) or the Random Forest Tree method. The face detecting device 250 may be configured to store a result of the detection of the face regions in the storage 120.

Further, the result synthesizing device 260 may be configured to synthesize the pedestrian area detected by the pedestrian detecting device 240 and the face regions detected by the face detecting device 250. The result synthesizing device 260 may then be configured to determine at least one of the face regions that overlaps the pedestrian area as a face of the pedestrian and perform synthesis. Specifically, the result synthesizing device 260 may be configured to determine a region having a highest score among the face regions that overlap the pedestrian area as the face of the pedestrian, and synthesize the region determined as the face of the pedestrian with the pedestrian area. The operation of the result synthesizing device 260 will be described in more detail with reference to FIG. 13.

Figure 6:
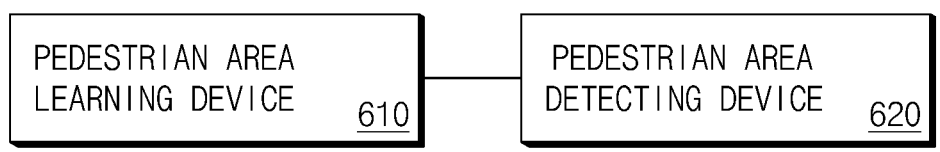
FIG. 6 illustrates a detailed block diagram of a pedestrian detecting device according to an exemplary embodiment of the present disclosure.

The operations of the pedestrian detecting device 240 and the face detecting device 250 will be mainly described to describe the operation of the controller 130 in detail. FIG. 6 is a block diagram of the pedestrian detecting device 240 according to an exemplary embodiment of the present disclosure. As illustrated in FIG. 6, the pedestrian detecting device 240 may include a pedestrian area learning device 610 and a pedestrian area detecting device 620.

The pedestrian area learning device 610 may be configured to generate a pedestrian classifier for classifying a pedestrian area. Specifically, the pedestrian area learning device 610 may be configured to generate a training feature aggregation image and generate a pedestrian classifier for classifying a pedestrian area from the training feature aggregation image. The pedestrian area learning device 610 may be configured to learn the classified pedestrian area when the pedestrian area is classified from the training feature image based on the pedestrian classifier. A more detailed description of the pedestrian area learning device 610 will be given with reference to FIG. 8.

The pedestrian area detecting device 620 may be configured to detect the pedestrian area from the feature aggregation images using the pedestrian classifier generated by the pedestrian area learning device 610. The operation of the pedestrian detecting device 240 included in the controller 130 will be described in more detail to describe the operation of the controller 130 in more detail.

Figure 7:
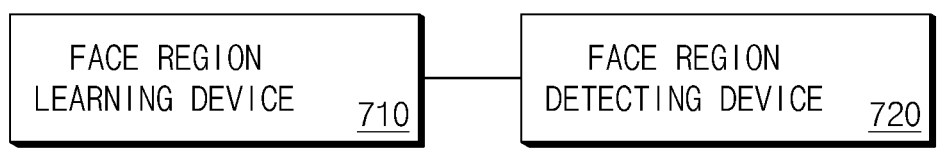
FIG. 7 illustrates a detailed block diagram of a face detecting device according to an exemplary embodiment of the present disclosure.

FIG. 7 illustrates a detailed block diagram of the face detecting device 250 according to an exemplary embodiment of the present disclosure. As illustrated in FIG. 7, the face detecting device 250 may include a face region learning device 710 and a face region detecting device 720. The face region learning device 710 may be configured to generate a face classifier for classifying a face region. Specifically, the face region learning device 710 may be configured to generate a training feature image and generate the face classifier for classifying a face region from the training feature image. In the disclosure, the training feature image may refer to an image from which feature information may be extracted from a training image for learning a face region. In addition, the face classifier may be generated using the decision tree (Adaboost Tree) method. The decision tree method may be a machine learning method, and may be a method of generating a strong classifier by learning weak classifiers more than a predetermined number of times and combining the classifiers. The face region learning device 710 may be configured to learn the classified face region when the face region is classified from the training feature image based on the face classifier.

Additionally, the face region detecting device 720 may be configured to detect face regions from feature pyramid images using the face classifier generated by the face region learning device 710. Although the face detecting device 250 is described as detecting the face regions from the training feature aggregation image based on the face classifier generated using the decision tree method in the present disclosure, it is not limited thereto, and the face regions may be detected by the SVM (Support Vector Machine) or the random forest tree method.

Figure 8:
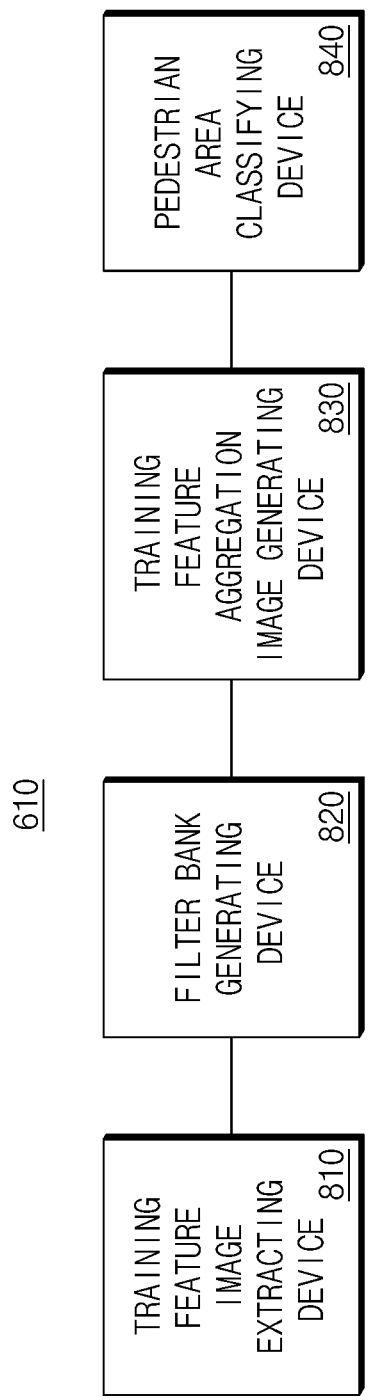
FIG. 8 illustrates a detailed block diagram of a pedestrian area learning device according to an exemplary embodiment of the present disclosure.

The operation of the pedestrian area learning device 610 included in the pedestrian detecting device 240 will be described in more detail below to describe the operation of the pedestrian detecting device 240 in more detail. FIG. 8 is a detailed block diagram of the pedestrian area learning device 610 according to an exemplary embodiment of the present disclosure. As illustrated in FIG. 8, the pedestrian area learning device 610 may include a training feature image extracting device 810, a filter bank generating device 820, a training feature aggregation image generating device 830, and a pedestrian area classifying device 840.

Particularly, the training feature image extracting device 810 may be configured to extract feature information from a training image acquired from a camera and generate a training feature image. The training image may include an image used to recognize and learn an object. Thus, the training image may include an object image and a non-object image. For example, the object image may include a pedestrian image, and the non-object image may include a non-pedestrian image. The training feature image extracting device 810 may be configured to generate a training feature image by extracting feature information including three LUV image channels, one magnitude channel, and six Histogram of Oriented Gradient (HoG) channels, forming a plurality of images including different feature information from the image, merging the plurality of images, and downscaling the merged image.

The filter bank generating device 820 may be configured to generate at least two filters capable of extracting a subdivided feature again from the training feature image and generate a filter bank by performing a convolution operation or a correlation operation on the two filters. In the disclosure, the filter bank may be used as a device for processing the training feature image such that the training feature image has a subdivided feature to learn the pedestrian area more accurately. The operation of the filter bank generating device 820 will be described in more detail with reference to FIGS. 9 and 10.

The training feature aggregation image generating device 830 may be configured to generate a training feature aggregation image by filtering a training feature image using a filter bank. Specifically, the training feature aggregation image may be generated by performing a convolution operation or a correlation operation on the filter bank and the training feature image. The training feature aggregation image may refer to an image having a feature more subdivided than the training feature image.

The pedestrian area classifying device 840 may be configured to generate a pedestrian classifier for classifying a pedestrian area in the training feature aggregation image. In particular, the pedestrian area classifying device 840 may be configured to generate the pedestrian classifier based on a decision tree (Adaboost tree) method. In the disclosure, the decision tree method may be a machine learning method, and may be a method of generating a strong classifier by learning weak classifiers more than a predetermined number of times and combining the classifiers. Although the pedestrian area classifying device 840 is described as classifying the pedestrian area using the pedestrian classifier generated based on the decision tree method in the disclosure, it is not limited thereto, and the pedestrian area may be classified according to the SVM (Support Vector Machine) or Random Forest Tree method.

Figure 9:
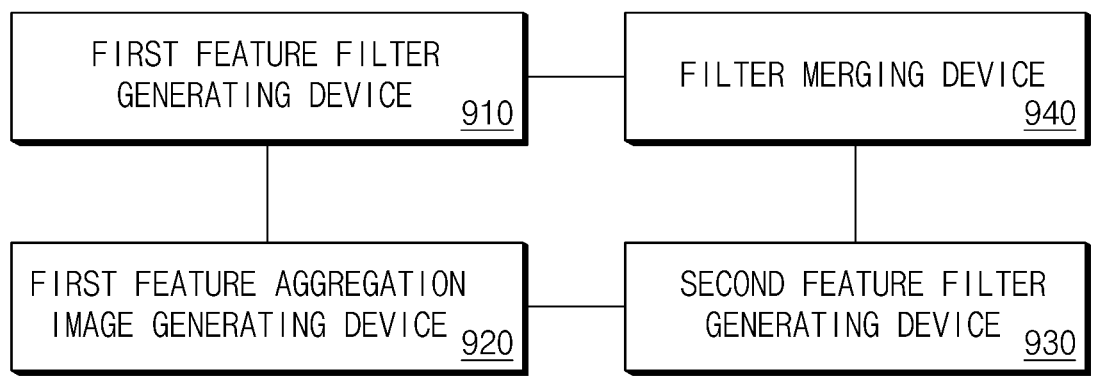
FIG. 9 illustrates a detailed block diagram of a filter bank generating device according to an exemplary embodiment of the present disclosure.

The operation of the filter bank generating device 820 included in the pedestrian learning device 610 will be described in more detail below to describe the operation of the pedestrian area learning device 610 in more detail. FIG. 9 is a detailed block diagram of a filter bank generating device according to an exemplary embodiment of the present disclosure. As illustrated in FIG. 9, the filter bank generating device 820 of the present disclosure may include a first feature filter generating device 910, a first feature aggregation image generating device 920, a second feature filter generating device 930, and a filter merging device 940.

In particular, the first feature filter generating device 910 may be configured to generate a first feature filter from a training feature image based on a binary pattern selected according to the Local Binary Pattern method. However, the first feature filter may be generated based on the PCA, InformedHaar, and LDCF method rather than limited to the Local Binary Pattern method. The operation of the first feature filter generating device 910 will be described in more detail with reference to FIG. 10.

The first feature aggregation image generating device 920 may be configured to generate a first feature aggregation image by filtering a training feature image using the first feature filter generated by the first feature filter generating device 910. Specifically, the first feature aggregation image generating device 920 may be configured to generate the first feature aggregation image by performing at least one of a convolution operation or a correlation operation on the first feature filter and the training feature image.

As an example, under the assumption that the training feature image is f(x) and the first feature filter is g(x), the first feature aggregation image generating device 920 may represent the convolution operation of the training feature image and the first feature filter as the following Equation (1).

$$y1 = \{f(x) * g(x)\} \qquad \text{Equation 1}$$

The second feature filter generating device 930 may be configured to generate a second feature filter based on the first feature aggregation image generated by the first feature aggregation image generating device 920. The second feature filter generating device 930 may be configured to generate a second feature filter from the first feature aggregation image based on the Locally De-correlated Channel Feature (LDCF) method. However, the second feature filter may be generated by another method, rather than limited to the LDCF method.

Further, the filter merging device 940 may be configured to perform at least one of a convolution operation or a correlation operation on the first feature filter generated by the first feature filter generating device 910 and the second feature filter generated by the second feature filter generating device 930 to generate a filter bank. For example, under the assumption that the first feature filter is g(x) and the second feature filter is h(x), the correlation filter merging device 940 may represent the convolution operation of the first feature filter and the second feature filter as the following Equation (2).

$$y2 = \{f(x) * g(x)\} * h(x) \qquad \text{Equation 2}$$

The equation 2 may be expressed by the convolution integral rule as Equation (3).

$$y2 = f(x) * \{g(x) * h(x)\} \qquad \text{Equation 3}$$

In other words, the filter merging device 940 may be configured to recognize the two feature filers including the first feature filter g(x) and the second feature filter h(x) as a single feature filter as in Equation (3) using the convolution integral rule.

Referring to FIG. 2 again, the "pre-generated filter bank" mentioned in the description of the operation of the feature aggregation image generating device 230 may refer to a filter bank generated by the filter merging device 940. Accordingly, the feature aggregation image generating device 230 may be configured to generate a feature aggregation image by performing a convolution operation or a correlation operation on the filter bank (recognized as a single feature filter) generated by the filter merging device 940 in advance and the feature pyramid images, thereby reducing a computation amount compared with that in the filter merging device 940. The feature aggregation image generating device 230 may more rapidly generate feature aggregation images for detecting a pedestrian area.

Figure 10:
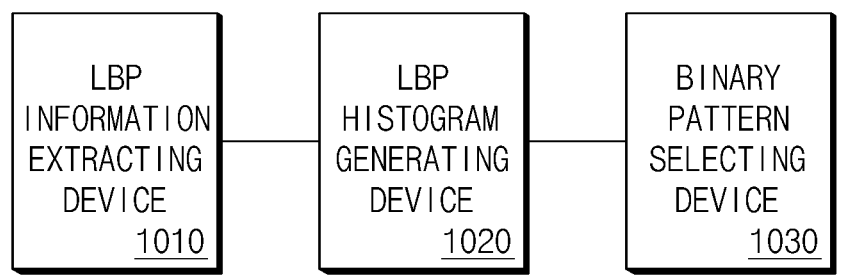
FIG. 10 illustrates a detailed block diagram of a first feature filter generating device according to an exemplary embodiment of present disclosure.

The operation of the first feature filter generating device included in the filter bank generating device will be described in detail to describe the operation of the filter bank generating device in detail. FIG. 10 is a detailed block diagram of the first feature filter generating device 910 of the present disclosure. As illustrated in FIG. 10, the first feature filter generating device 910 of the present disclosure may include an LBP information extracting device 1010, an LBP histogram generating device 1020, and a binary pattern selecting device 1030.

The LBP information extracting device 1010 may be configured to extract LBP information from each pixel of a training feature image. A detailed description will be given with reference to FIG. 11. FIG. 11 schematically illustrates a method of extracting LBP information from each pixel of a training feature image according to an exemplary embodiment of the present disclosure. As illustrated in FIG. 11, the LBP information extracting device 1010 may be configured to divide a training feature image into a plurality of blocks and divide one block into a plurality of pixels 1110. The LBP information extracting device 1010 may be configured to generate a binary image from each pixel using a difference in a brightness value of each of the plurality of pixels 1110 and extract the LBP information from the binary image.

For example, the LBP information extracting device 1010 may be configured to extract the LBP information using the differences in the brightness value between a center pixel having a brightness value of 80 and the neighboring pixels surrounding the center pixel among the plurality of pixels 1110. For example, the LBP information extracting device 1010 may be configured to generate a binary image 1120 by converting the brightness value to 0 when the differences in the brightness value is greater than or equal to 0, and to 1 when the differences in the brightness value is less than 0, and extract the LBP information (0 1 1 0 1 0 0 1) by arranging the numbers from the pixel located at the upper left of the binary image 1120.

Additionally, the LBP histogram generating device 1020 may be configured to generate an LBP histogram using the LBP information extracted by the LBP information extracting device 1010. For example, the LBP histogram generating device 1020 may be configured to generate a histogram having, as bins, pixel values acquired by converting the extracted LBP information into decimal numbers. For example, the LBP histogram generating device 1020 may be configured to generate a histogram for total 256 numbers from a pixel value of 0 acquired by converting the LBP information (0 0 0 0 0 0 0) into a decimal number to a pixel value of 256 acquired by converting the LBP information (1 1 1 1 1 1 1 1) into a decimal number, that is, a histogram having 256 as bins. According to the exemplary embodiment of the present disclosure, the LBP histogram generating device 1020 may be configured to generate a histogram of object data (positive) and a histogram of non-object data (negative) to be learned using the LBP information.

The binary pattern selecting device 1030 may be configured to compare the histogram of the non-object data with the histogram of the object data. In particular, the binary pattern selecting device 1030 may be configured to sort the bins from the bin having a highest occurrence probability of binary patterns to the bin having a lowest occurrence probability of binary patterns and then select n binary patterns having the highest probability with respect to the binary patterns of the object data when the occurrence probability of binary patterns of the object data is higher than the occurrence probability of binary patterns of the non-object data. Then, the binary pattern selecting device 1030 may be configured to generate the selected n binary patterns as the first feature filter.

The operation of the result synthesizing device 260 included in the controller 130 will be described in more detail with reference to FIGS. 12A-12D to describe the operation of the controller 130 in more detail. FIGS. 12A-12D schematically illustrate synthesis of results according to an exemplary embodiment of the present disclosure;

As illustrated in FIGS. 12A-12D, the result synthesizing device 260 may be configured to synthesize an image (FIG. 12A) in which a pedestrian area 1210 detected by the pedestrian detecting device 240 is represented and an image (FIG. 12B) in which face regions 1220, 1230, 1240, and 1250 detected by the face detecting device 250 are represented (FIG. 12C), and generate a result image (FIG. 12D) in which the pedestrian area 1210 and the face region 1230 are synthesized. In displaying the pedestrian area or the face region, the result synthesizing device 260 may be configured to calculate a probability that an object of an image existing in the pedestrian area, which is detected based on the pedestrian classifier and the face classifier generated by the pedestrian detecting device 240 and the face detecting device 250, is a pedestrian and a probability that an object of an image existing in the detected face region is a face, and generate a score based on the calculated probabilities.

For example, the score may be generated in proportion to a calculated probability value. In other words, the score may be generated to have a higher value as the calculated probability has a higher value. The result synthesizing device 260 may be configured to output a score together with the pedestrian area and the face region. For example, as illustrated in FIG. 12C, the result synthesizing device 260 may be configured to set the score of the face region 1220 to 15, the score of the face region 1230 to 68, the score of the face region 1240 to 49, and the score of the face region 1250 to 17 and output the scores.

Figure 12:
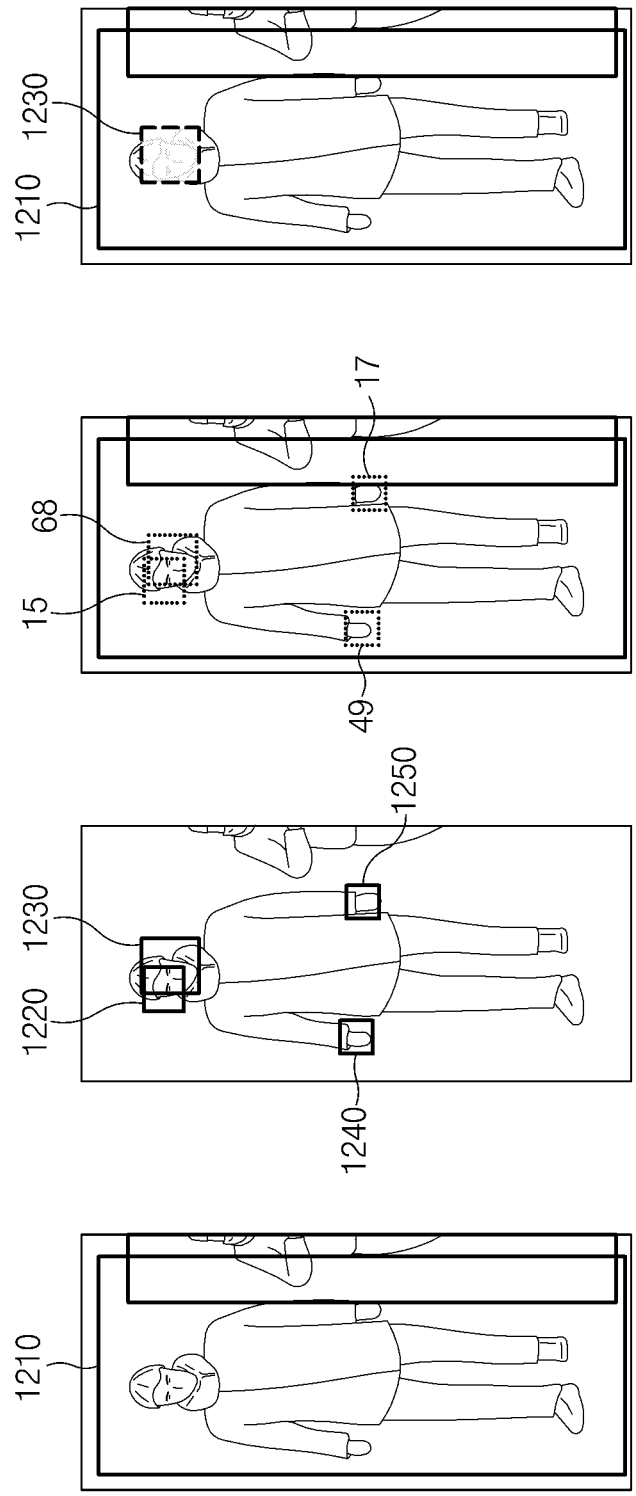
FIGS. 12A-12D schematically illustrate synthesis of results according to an exemplary embodiment of the present disclosure.

The result synthesizing device 260 may then be configured to determine the region 1230 having a highest score among the face regions 1220, 1230, 1240, and 1250 that overlap the pedestrian area as a face of a pedestrian, and generate an image in which the region 1230 determined as the face of the pedestrian are represented together with the pedestrian area 1210 as a result image (see FIG. 12D). Therefore, the apparatus for detecting an object of a vehicle according to the present disclosure may more accurately determine and detect the face region of the pedestrian in the pedestrian area as illustrated in FIG. 12D. Further, the technology of detecting the face region more accurately by the apparatus for detecting an object according to the present disclosure may be utilized to a technical field for preventing privacy invasion by blurring only the detected face region, and may be utilized in a technical field for accurately dealing with or preventing crime occurring in the vicinity of a vehicle by more accurately determining the face of the pedestrian.

Figure 13:
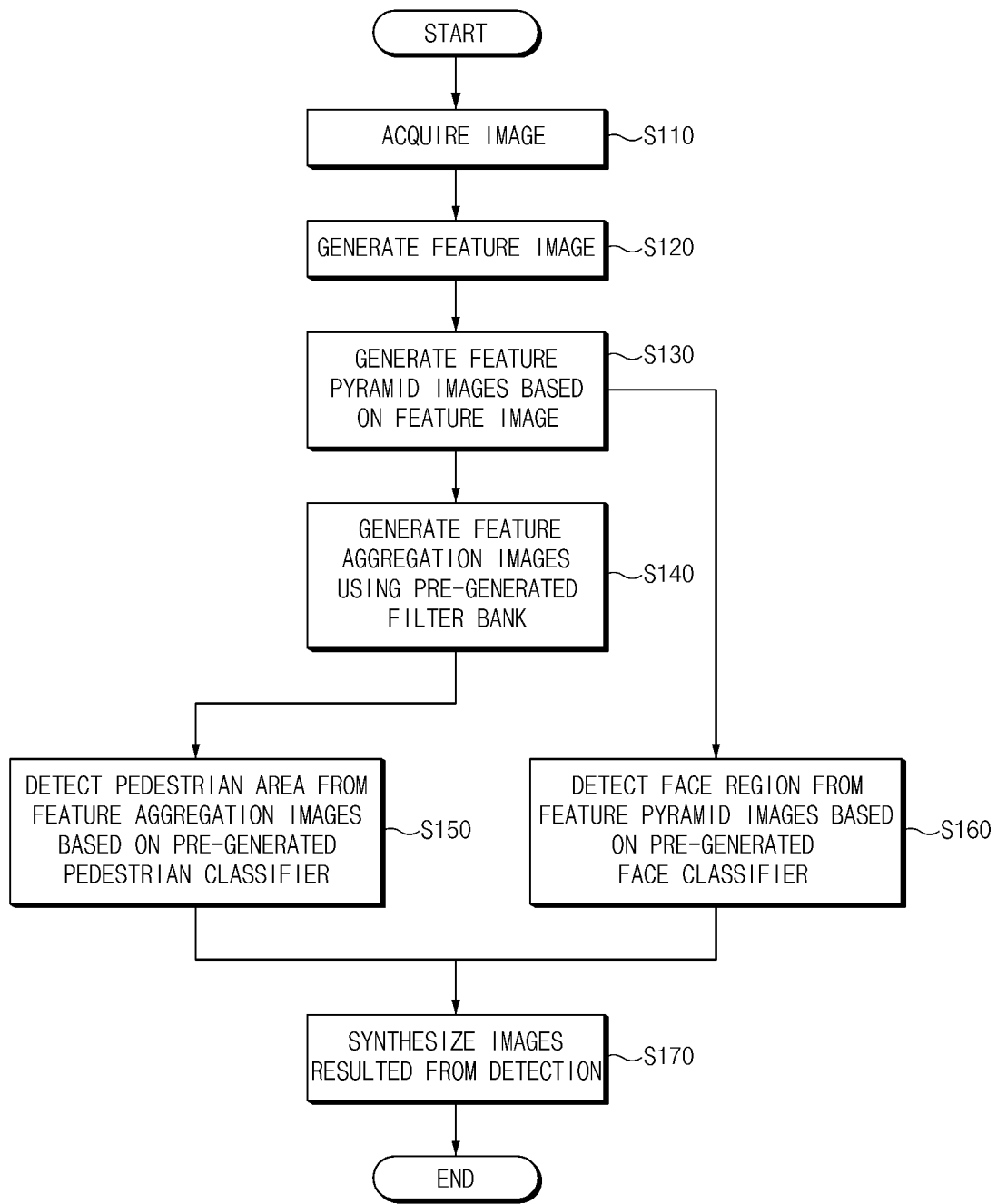
FIG. 13 illustrates a flowchart of a method for detecting an object of a vehicle according to an exemplary embodiment of the present disclosure.

FIG. 13 illustrates a flowchart of a method for detecting an object of a vehicle according to an exemplary embodiment of the present disclosure. The method described herein below may be executed by the controller 130 specifically programmed to executed the process. As illustrated in FIG. 13, the controller 130 may be configured to acquire an image from the camera 110 (S110).

The feature extracting device 210 may be configured to extract feature information from the image obtained in S110 to generate a feature image (S120). In S120, the feature extracting device 210 may be configured to extract the feature information including three LUV image channels, one magnitude channel, and six Histogram of Oriented Gradient (HoG) channels, form a plurality of images including different feature information from the image acquired in S110, merge the plurality of images, and down-scale the merged image to generate a feature image.

Further, the feature pyramid generating device 220 may be configured to generate feature pyramid images including feature images of different sizes by repeatedly down-scaling a feature image from an original size at a predetermined ratio (S130). In S130, the feature pyramid generating device 220 may be configured to generate a feature pyramid based on the ACF (Aggregate Channel Features) method. The feature aggregation image generating device 230 may be configured to generate feature aggregation images by filtering the feature pyramid images using a pre-generated filter bank (S140). In S140, the feature aggregation image generating device 230 may be configured to generate the feature aggregation images by performing a convolution operation or a correlation operation on the filter bank and the feature pyramid images.

The pedestrian detecting device 240 may then be configured to detect a pedestrian area from the feature aggregation images based on a pedestrian classifier for classifying a pre-generated pedestrian area (S150). The operation of generating a pedestrian classifier for classifying the pedestrian area will be described in detail with reference to FIG. 14. The face detecting device 250 may be configured to detect the face regions from the feature pyramid images based on the face classifier for classifying the pre-generated face region (S160). The operation of generating a face classifier for classifying a face region will be described in detail with reference to FIG. 15.

The result synthesizing device 260 may be configured to synthesize the pedestrian area detected in S150 and the face region detected in S160 (S170). In S170, the result synthesizing device 260 may be configured to determine at least one of face regions that overlap the pedestrian area as a face of a pedestrian, and perform synthesis. In S170, the result synthesizing device 260 may be configured to determine a region having a highest score among the face regions that overlap the pedestrian area as the face of the pedestrian, and synthesize the region determined as the face of the pedestrian with the pedestrian area.

Figure 14:
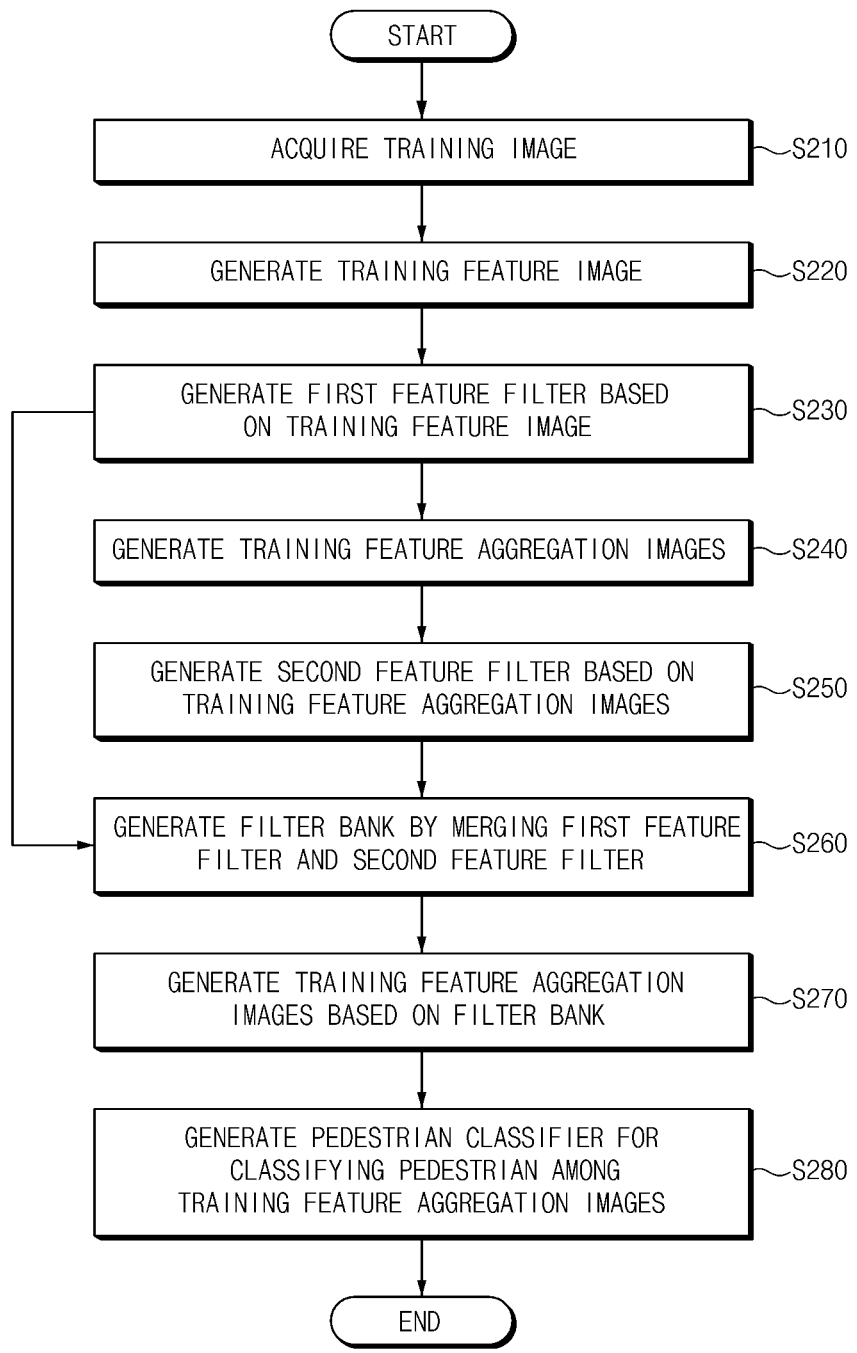
FIG. 14 illustrates a flowchart of a method of generating a pedestrian classifier according to an exemplary embodiment of the present disclosure.

FIG. 14 illustrates a flowchart of a method of generating a pedestrian classifier according to an exemplary embodiment of the present disclosure. As illustrated in FIG. 14, the training feature image extracting device 810 may be configured to acquire a training image (S210), extract feature information from the acquired training image, and generate a training feature image (S220).

The filter bank generating device 820 may then be configured to generate a first feature filter based on the training feature image (S230). In S230, the filter bank generating device 820 may be configured to generate the first feature filter based on the local binary pattern method from the training feature image. The filter bank generating device 820 may additionally be configured to generate a first feature aggregation image by filtering the training feature image with the first feature filter (S240). In S240, the filter bank generating device 820 may be configured to generate a first feature aggregation image by performing a convolution operation or a correlation operation on the first feature filter and the training feature image. The filter bank generating device 820 may also be configured to generate a second feature filter based on the first feature aggregation image (S250). The filter bank generating device 820 may then be configured to generate a filter bank by merging the first feature filter and the second feature filter (S260).

The training feature aggregation image generating device 830 may be configured to generate a training feature aggregation image by filtering the training feature image with the filter bank (S270). In step S270, the training feature aggregation image generating device 830 may be configured to generate a training feature aggregation image by performing a convolution operation or a correlation operation on the filter bank and the training feature image. The pedestrian area classifying device 840 may be configured to generate a pedestrian classifier for classifying the pedestrian area in the training feature aggregation image (S280). In S280, the pedestrian area classifying device 840 may be configured to generate the pedestrian classifier based on the decision (Adaboost) tree method.

Figure 15:
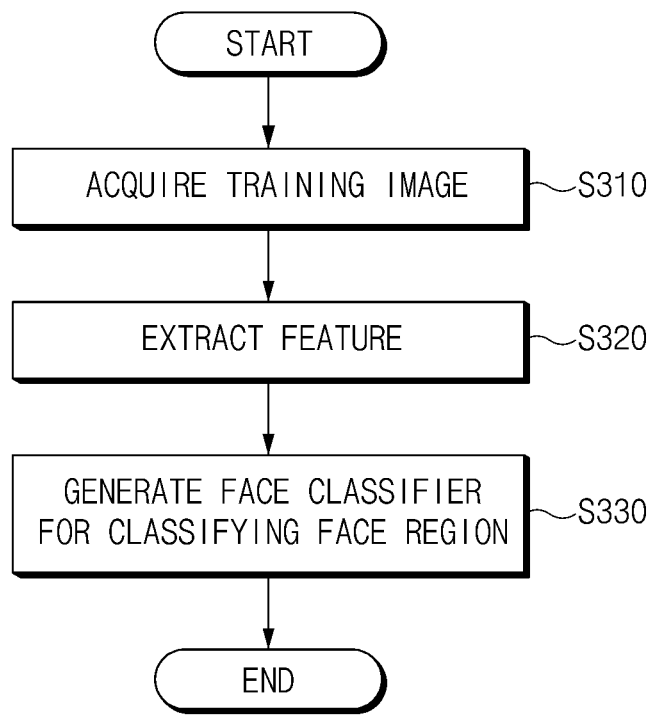
FIG. 15 illustrates a flowchart of a method of generating a face classifier according to an exemplary embodiment of the present disclosure.

FIG. 15 illustrates a flowchart of a method of generating a face classifier according to an exemplary embodiment of the present disclosure. As illustrated in FIG. 15, the face region learning device 710 may be configured to acquire a training image (S310), extract feature information from the acquired training image, and generate a training feature image (S320). The face region learning device 710 may be configured to generate a face classifier for classifying a face region in the training feature image (S330). In S330, the face region learning device 710 may be configured to generate the face classifier using the decision tree (Adaboost tree) method.

Figure 16:
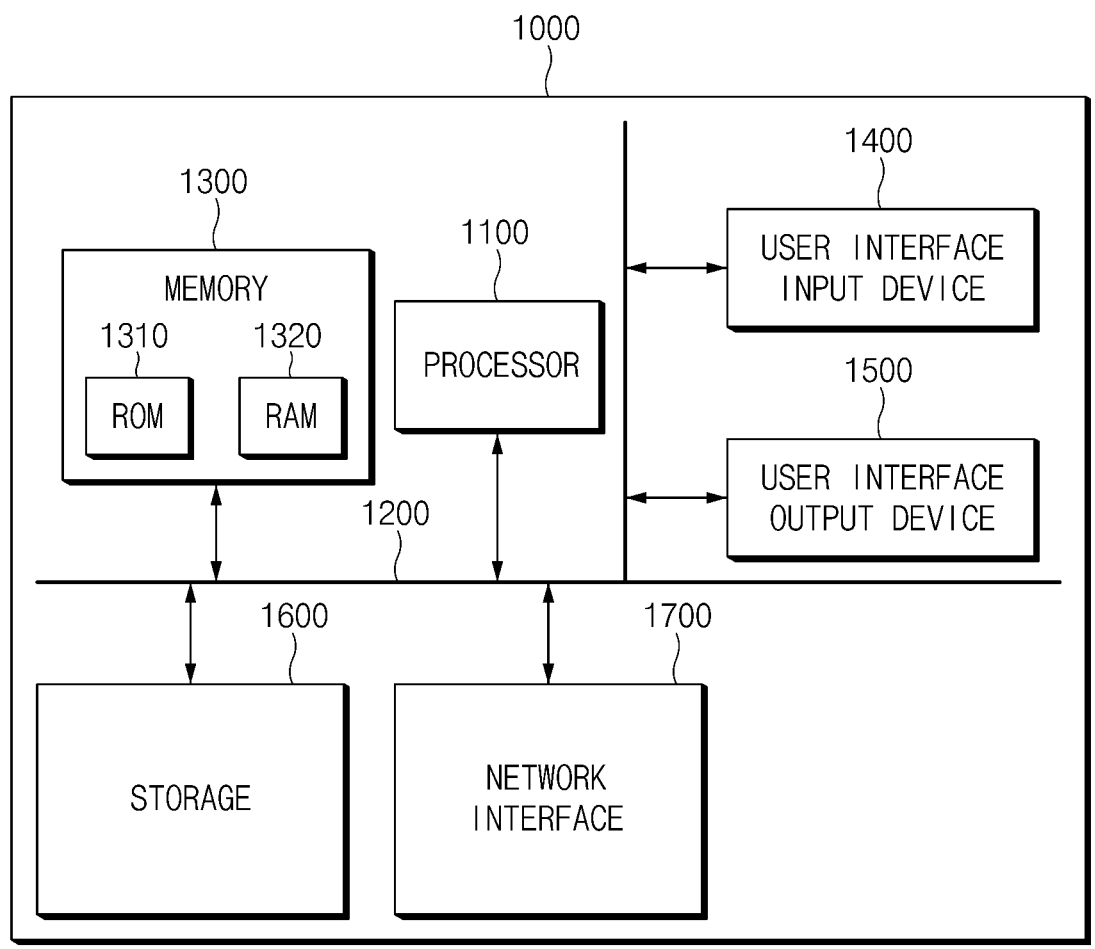
FIG. 16 illustrates a configuration of a computing system for executing a method according to an exemplary embodiment of the present disclosure.

FIG. 16 illustrates a configuration of a computing system for executing a method according to an exemplary embodiment of the present disclosure. Referring to FIG. 16, a computing system 1000 may include at least one processor 1100, a memory 1300, a user interface input device 1400, a user interface output device 1500, storage 1600, and a network interface 1700, which are connected with each other via a bus 1200.

The processor 1100 may be a central processing device (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) and a RAM (Random Access Memory).

Thus, the operations of the method or the algorithm described in connection with the exemplary embodiments disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, and a CD-ROM. The exemplary storage medium may be coupled to the processor 1100, and the processor 1100 may read information out of the storage medium and may record information in the storage medium. Alternatively, the storage medium may be integrated with the processor 1100. The processor 1100 and the storage medium may reside in an application specific integrated circuit (ASIC). The ASIC may reside within a user terminal. In another case, the processor 1100 and the storage medium may reside in the user terminal as separate components.

The apparatus and method for detecting an object of a vehicle according to an exemplary embodiment of the present disclosure may more accurately detect a pedestrian and a face of the pedestrian from an acquired camera image acquired and may be utilized in a technical field requiring accurate pedestrian detection and face detection. For example, it may be possible to utilize the apparatus and method for detecting an object of a vehicle to blur only the face region due to the problem of privacy invasion, or prevent crime around the vehicle by more accurately recognizing the face of a pedestrian.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims. Therefore, the exemplary embodiments of the present disclosure are provided to explain the spirit and scope of the present disclosure, but not to limit them, so that the spirit and scope of the present disclosure is not limited by the exemplary embodiments. The scope of the present disclosure should be construed on the basis of the accompanying claims, and all the technical ideas within the scope equivalent to the claims should be included in the scope of the present disclosure.

What is claimed is:

1. An apparatus for detecting an object of a vehicle, comprising:
a camera configured to acquire an image of an area in front of the vehicle; and
a controller configured to generate feature pyramid images based on a plurality of feature images extracted from the image, generate feature aggregation images by filtering the feature pyramid images, detect a pedestrian area from the feature aggregation images, detect face regions from the feature pyramid images, and determine at least one of the face regions that overlaps the pedestrian area as a face of a pedestrian,
wherein the controller is configured to generate a filter bank by performing a convolution operation or a correlation operation on a first feature filter and a second feature filter and generate the feature aggregation images by filtering the feature pyramid images using the filter bank.

2. The apparatus of claim 1, wherein the feature pyramid images are generated by down-scaling the feature image from an original size at a predetermined ratio.

3. The apparatus of claim 1, wherein the controller is configured to generate a training feature image based on feature information extracted from a training image and generates the first feature filter from the training feature image based on a Local Binary Pattern method.

4. The apparatus of claim 3, wherein the controller is configured to generate a first feature aggregation image by filtering the training feature image using the first feature filter and generate a second feature filter from the first feature aggregation image based on a Locally De-correction Channel Feature (LDCF) method.

5. The apparatus of claim 4, wherein the controller is configured to generate a training feature aggregation image by filtering the training feature image using the filter bank and generate a pedestrian classifier for classifying the pedestrian area in the training feature aggregation image.

6. The apparatus of claim 5, wherein the controller is configured to detect the pedestrian area from the feature aggregation images using the pedestrian classifier.

7. The apparatus of claim 1, wherein the controller is configured to synthesize a region, having a highest score among the face regions that overlap the pedestrian area, with the pedestrian area.

8. The apparatus of claim 7, wherein the controller is configured to determine the region having the highest score as the face of the pedestrian.

9. The apparatus of claim 8, wherein the controller is configured to calculate a probability that an object of the image in the face region that overlaps the pedestrian area is a face of the pedestrian, and generate the score based on the probability.

10. A method for detecting an object of a vehicle, comprising:
acquiring, by a controller, an image of an area in front of the vehicle;
generating, by the controller, feature pyramid images based on a plurality of feature images extracted from the image;
generating, by the controller, feature aggregation images by filtering the feature pyramid images;
detecting, by the controller, a pedestrian area from the feature aggregation images;
detecting, by the controller, face regions from the feature pyramid images; and
determining, by the controller, at least one of the face regions overlapping the pedestrian area as a face of a pedestrian,
wherein the controller is configured to generate a filter bank by performing a convolution operation or a correlation operation on a first feature filter and a second feature filter and generate the feature aggregation images by filtering the feature pyramid images using the filter bank.

11. The method of claim 10, wherein the feature pyramid images are generated by down-scaling the feature image from an original size at a predetermined ratio.

12. The method of claim 10, wherein the first feature filter generates a training feature image based on feature information extracted from a training image, and generates the first feature filter from the training feature image based on a Local Binary Pattern method.

13. The method of claim 12, wherein the second feature filter generates a first feature aggregation image by filtering the training feature image using the first feature filter and generates a second feature filter from the first feature aggregation image based on a Locally De-correction Channel Feature (LDCF) method.

14. The method of claim 13, further comprising:
generating, by the controller, a training feature aggregation image by filtering the training feature image using the filter bank; and
generating, by the controller, a pedestrian classifier for classifying the pedestrian area in the training feature aggregation image.

15. The method of claim 14, further comprising:
detecting, by the controller, the pedestrian area from the feature aggregation images using the pedestrian classifier.

16. The method of claim 10, further comprising:
synthesizing, by the controller, a region, having a highest score among the face regions overlapping the pedestrian area, with the pedestrian area.

17. The method of claim 16, further comprising:
determining, by the controller, the region having the highest score as the face of the pedestrian.

18. The method of claim 17, further comprising:
calculating, by the controller, a probability that an object of the image in the face region overlapping the pedestrian area is a face of the pedestrian, and generating the score based on the probability.

* * * * *